Feb. 9, 1926.
E. LARREY
ROTARY PERCOLATOR
Filed July 27, 1925
1,572,861
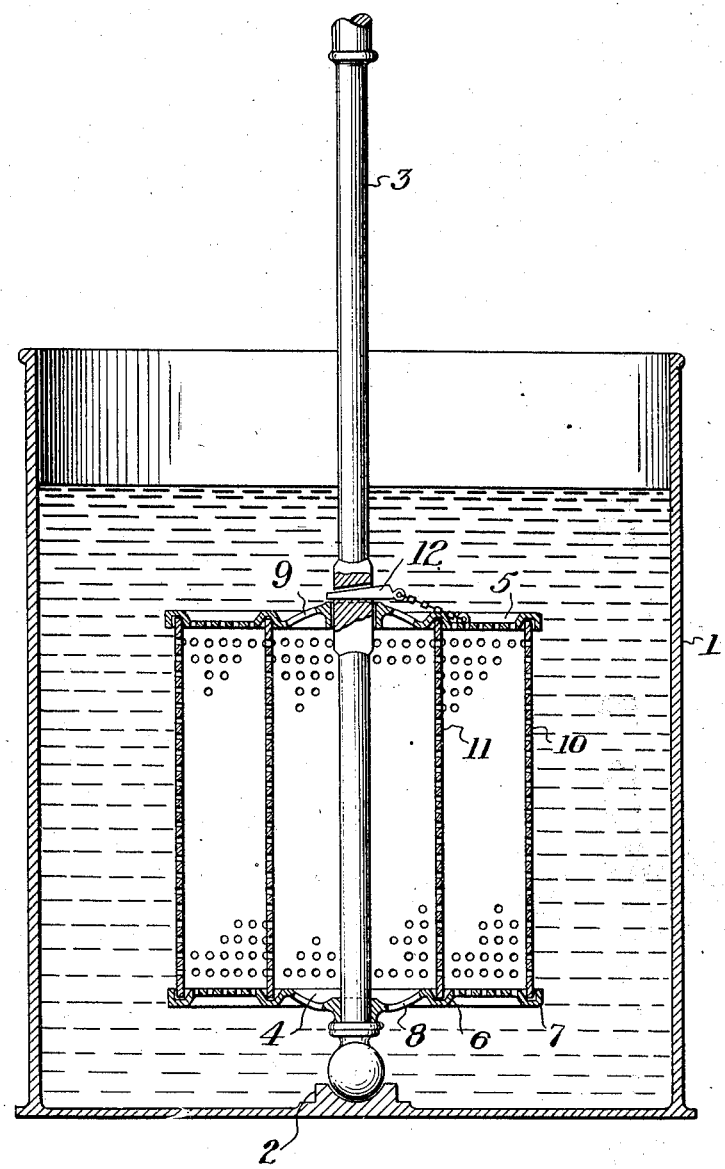
Inventor:
Elisa Larrey
by Emil Bönnelyck
Attorney Patented Feb. 9, 1926.

1,572,861

UNITED STATES PATENT OFFICE.

ELISA LARREY, OF MEXICO, MEXICO.

ROTARY PERCOLATOR.

Application filed July 27, 1925. Serial No. 46,409.

*To all whom it may concern:*

Be it known that I, ELISA LARREY, a citizen of the United Mexican States, residing at Mexico city, Federal District, Mexico, have invented certain new and useful Improvements in Rotary Percolators, of which the following is a specification.

This invention relates to apparatus for making all kinds of infusion extracts by using centrifugal force for obtaining percolation.

It is known to make coffee in percolators whereby the boiling water filters through by gravity.

In my apparatus the liquid is made to filter through by centrifugal force.

In percolators, the solid substance is supported above the liquid and vertical filtration is obtained by gravity—while in my apparatus the solid is submerged in the liquid which laterally filters out through the solid by centrifugal force.

The friction of the liquid passing through the solid by gravity is proportional to its weight; on the other hand when caused by centrifugal force it is proportionally augmented by the speed of rotation, and the infusions are consequently obtained in less time.

In the drawing which shows as an example a vertical cross section of a receptacle containing some liquid, in which is submerged a revolving filter cage, 1 is the receptacle for the liquid, hot water if coffee is the extract to be made.

In the bottom of said receptacle is a shaft socket (2) for the lower end of the shaft (3), carrying the perforated bottom disk (4) and piercing the perforated cover (5) of the cage.

The bottom (4) and the cover (5) are provided with annular concentric grooves (6) and (7) and slots (8) and (9).

A perforated exterior cylinder (10) and an interior perforated cylinder (11) are mounted in the grooves between the bottom and the cover, and are held together by the pin (12) when inserted into the perforation of the shaft (3), thus completing the formation of the cage.

In order to make coffee, the cover (5) is raised above the square section of the shaft (3) in order that roasted ground coffee may be charged into the annular space formed between the outer and inner walls (10) and (11) of the cage. Thereupon the cover is lowered and the pin (12) is re-inserted.

When the water in the receptacle (1) is boiling the revolving cage or centrifugal percolator is submerged in the water and revolved by hand in both directions, or by a transmission pulley or pinion on the shaft (3).

The centrifugal percolator may take the form of a perforated drum, in which case only the exterior cylinder (10) is employed and the inner cylinder (11) is omitted.

When the coffee or other finely ground material is employed for making the extract, then the liquid is less free to pass and naturally the material should be spread out in a layer, for which purpose the inner cylinder (11) is employed.

In other instances it may be necessary to grind the material still finer so that greater yield may be obtained, and in such event the drum or the annular space between the cylinders (10) and (11) is lined with some fine cloth.

If the opening of the receptacle be made narrow, then the liquid will follow the inside of the receptacle and discharge towards the center on top of the revolving cage.

The bottom and cover may only have slots (8) and (9) between the shaft (3) and the inner cylinder (11), so that the liquid will only enter laterally into the annular space confined between both cylinders (10) and (11).

This apparatus is useful for making all kinds of infusion extracts and for separating candelilla wax.

What I claim is:

1. A percolator adapted to be rotatably mounted in a receptacle containing liquid and comprising a rotary shaft, and a filter cage to receive the substance to be treated secured to said shaft to rotate therewith and completely submergible in the liquid; said cage embodying a perforated side wall, and perforated top and bottom walls through which the shaft axially extends and with which it is connected, said top and bottom walls having openings other than their perforations for admitting liquid freely into the interior of the cage to be discharged laterally therefrom by centrifugal force through the perforations in the side wall.

2. A percolator adapted to be rotatably mounted in a receptacle containing liquid and comprising a rotary shaft, and a filter cage secured to said shaft to rotate therewith and completely submergible in the liquid; said cage embodying concentric inner and outer perforated side walls which are spaced from each other to form an intermediate annular substance-receiving chamber, and perforated top and bottom walls through which said shaft axially extends and with which it is connected.

3. A percolator adapted to be rotatably mounted in a receptacle containing liquid and comprising a rotary shaft, and a filter cage secured to said shaft to rotate therewith and completely submergible in the liquid; said cage embodying concentric inner and outer perforated side walls which are spaced from each other to form an intermediate annular substance-receiving chamber, and perforated top and bottom walls through which said shaft axially extends and with which it is connected, said top and bottom walls having openings other than their perforations for admitting liquid freely into said chamber to be discharged laterally therefrom by centrifugal force through the perforations in the outer side wall.

4. A percolator, according to claim 3, in which the inner side wall of the cage is spaced an appreciable distance from the shaft; and in which the inlet openings in the top and bottom walls are directly in line with such space.

5. A percolator adapted to be rotatably mounted in a receptacle containing liquid and comprising a rotary shaft, and a filter cage to receive the substance to be treated secured to said shaft to rotate therewith and completely submergible in the liquid; said cage embodying a perforated side wall, and top and bottom walls through which the shaft axially extends and with which it is connected, said top and bottom walls having slots to admit liquid freely into the interior of the cage to be discharged laterally therefrom by centrifugal force through the perforations in the side wall.

6. A percolator adapted to be rotatably mounted in a receptacle containing liquid and comprising a rotary shaft, and a filter cage secured to said shaft to rotate therewith and completely submergible in the liquid; said cage embodying concentric inner and outer perforated side walls which are spaced from each other to form an intermediate annular substance-receiving chamber, and top and bottom walls through which said shaft axially extends and with which it is connected; the inner side wall being spaced an appreciable distance from the shaft, and the top and bottom walls being formed with slots which directly aline with such space to admit liquid freely thereinto, whereby the liquid is caused to pass laterally through said chamber by centrifugal force.

In testimony whereof I have affixed my signature.

ELISA LARREY.